J. C. MACKEY.
PLATE FOR MENDING SHEET-METAL WARE.
No. 185,339.                    Patented Dec. 12, 1876.
Witnesses —
Rich'd K. Evans
Geo. H. Evans
Inventor —
John C. Mackey
by his attys
A. H. Evans & Co.

UNITED STATES PATENT OFFICE.

JOHN C. MACKEY, OF GRAND RAPIDS, MICHIGAN.

IMPROVEMENT IN PLATES FOR MENDING SHEET-METAL WARE.

Specification forming part of Letters Patent No. 185,339, dated December 12, 1876; application filed November 16, 1876.

*To all whom it may concern:*

Be it known that I, JOHN C. MACKEY, of Grand Rapids, in the State of Michigan, have invented a new and Improved Mending-Strip to Patch Sheet Metal; and I hereby declare the following to be a full, clear, and exact description thereof, reference being had to the accompanying drawing, making part of this specification, in which—

Figure 1 is a cross-sectional view of my improved mending strip or plate.

The object of my invention is to supply a ready means for mending breaks, leaks, &c., in metallic vessels and utensils; and it consists in providing a sheet-metal strip or plate with a coating of solder and a suitable flux, so that the article thus made can, by any housekeeper, be cut into bits and applied to breaks in metal articles.

In order that those skilled in the art may make and use my invention, I will proceed to describe the manner in which I have carried it out.

In the said drawings, A is a plate or sheet of thin pliable sheet metal. On its surface I deposit, in any well-known manner, a coating of solder, B, covering its surface uniformly. Over the surface of the solder-face I smear a flux, to insure adhesion to the object to be mended. This flux may be of any of the well-known varieties, such as rosin, muriatic acid, oil, &c.; but I find on experiment that the best flux to use is an admixture of oil and rosin in such proportions that when the mixture is smeared on the solder it will not stick to the fingers or the package in which it is put, and at the same time be sufficiently pliable to bend with the plate, and not scale off when any change of form takes place. I find this proportion to be about one part of oil, in weight to four parts of rosin.

The operation of using the mending-plate is as follows: Around the leak in the article to be mended the surface of the metal is scraped with a knife, or other implement, so as to expose a new surface, a piece of the mending-plate is placed over the leak, heat and pressure are applied, the solder causes the plate A to adhere to the article being mended, and the leak is closed.

Having thus described my invention, what I claim as new, and desire to secure by Letters Patent, is—

As a new article of manufacture, a sheet-metal strip or plate, provided with a facing of solder, and treated with a flux, for the purpose set forth.

JOHN C. MACKEY.

Witnesses:
RICHD. K. EVANS,
G. H. EVANS.